United States Patent [19]
Hartung

[11] 3,731,175
[45] May 1, 1973

[54] SERVO SYSTEM FOR VELOCITY AND POSITION CONTROL

[75] Inventor: Dudley B. Hartung, Somerville, Mass.

[73] Assignee: Xerox Corporation, Waltham, Mass.

[22] Filed: Mar. 6, 1972

[21] Appl. No.: 232,078

[52] U.S. Cl. .............318/570, 318/573, 235/151.11
[51] Int. Cl. .............................................G05b 19/24
[58] Field of Search.....................318/570, 571, 573, 318/574; 235/151.11

[56] References Cited

UNITED STATES PATENTS

| | | | |
|---|---|---|---|
| 3,548,281 | 12/1970 | Anis | 318/573 X |
| 3,676,650 | 7/1972 | Henegar | 235/151.11 |
| 3,676,760 | 7/1972 | McDaniel | 318/571 |
| 3,685,375 | 8/1972 | Hill | 318/570 X |

Primary Examiner—Benjamin Dobeck
Attorney—Gerald E. McGlynn, Jr. et al.

[57] ABSTRACT

An automatic control system in the form of a servomechanism is disclosed which is especially adapted for position and velocity control for machine tools. The invention provides increased accuracy and enables high speed operation by utilizing input command signals with the controlled axis variable expressed as a function of a reference axis variable. A signal processor operates on the command signal to produce control signals for the servo, such as position, velocity and acceleration signals. Preferably the command signals take the form of first and second difference signals and the necessary time base signal is supplied from a signal generator connected with the reference axis drive means so as to produce a velocity signal corresponding to motion with respect to the reference axis. The system is implemented in a manner to accept digital input signals from an interpolator or computer and to produce analog control signals for the servo.

20 Claims, 3 Drawing Figures

SERVO SYSTEM FOR VELOCITY AND POSITION CONTROL

This invention relates to control systems and more particularly to automatic control of processes and machines.

In many industrial applications there is a need for automatic control of the value of two or more physical quantities as a function of a third quantity and successful operation depends upon great accuracy in the control of the quantities. The variable quantities in the case of a machine may be displacement, velocity and time, for example, and in the case of an industrial process, the quantities may be temperature, concentration and time, for example. Whatever the particular physical quantities may be, there is a need for improvement of automatic control systems in respect to maintaining precise values and precise correlation of the values of the variable quantities. Heretofore, it has been a common practice in such control systems to maintain or regulate the values of the two or more variable quantities as a function of time on the premise that strict adherence to the time base for each variable will result in precise correlation of the values of the variables. The difficulty with this kind of system is that the control of one given variable as a function of time may be subject to conditions affecting response to control influence which are different from such conditions for another given variable quantity and, accordingly, the values of the variable quantities may fall out of synchronism, i.e. there may be a loss of accurate correlation of the values of the quantities.

This invention has been developed for use in the automatic control of machine tools. However, it will be apparent as the description proceeds that it is also applicable to process control. The invention is useful in the broad class of control systems known as automatic feedback control systems and in the illustrative embodiment to be set forth herein it is used in a servomechanism in which the variable quantity to be controlled is position or velocity of an element.

In the control of machine tools by conventional numerical control systems or by computer numerical control systems (sometimes referred to as soft-wired numerical control) of the continuous path or contouring type, it is necessary to control the velocity and position of machine elements with reference to two or more axes. In such systems the command signals are commonly developed in digital form with a separate signal for each axis to be controlled. Relative motion of the cutter and workpiece is produced by a separate servo for each axis so that a cut path corresponding to the desired contour is generated by the concurrent energization of the separate servos. Typically, the command signals from the interpolator are in digital form and the servos are of the analog type so that it is necessary to make a digital to analog conversion of the signals for each control axis. For the positional control servo a digital feedback signal is generated corresponding to the actual position of the control element and is supplied to a comparator along with the digital command signal representing the desired position of the element. The comparator develops a signal corresponding to the difference between the command and the follow-up signal which, after conversion to analog form, is applied to the input of the analog servo to control the servo motor to reduce the position error signal to zero. Thus the prior art systems may be characterized as having a separate command signal and servo system for each axis of the machine, together with means for developing a position error signal from the command and feedback signals for control of the servo system. Such a system is described in the U.S. Pat. No. 2,537,427 granted to Seid et al. on Jan. 9, 1951 for "Digital Servo." Although such systems have proved to be very useful, they do not provide the high degree of accuracy and fast response as is required for precision high-speed machine tools.

In accordance with this invention there is provided an automatic control system which is capable of extremely precise control of the change of one variable quantity in relation to another with the change being effected at a controlled rate which may be of high value. This is accomplished, in general, by controlling one variable as a function of the other in a feedback control system. Input to the system for control purposes comprises successive discrete command signals each of which represents the desired change, and hence the first order difference, of the dependently variable quantity corresponding to a fixed increment of change of the independently variable quantity. The system produces a feedback signal which represents the actual change of the dependently variable quantity and an error signal is produced corresponding to the difference between the feedback signal and the sum of previous command signals. The dependently variable quantity is changed continuously in accordance with the error signal until the error signal is reduced to zero and when the independently variable quantity has changed by the fixed incremental amount, the next command signal is produced. The rate of change of the dependently variable quantity may be controlled in accordance with desired velocity and acceleration values by signals which may be developed from first and second order difference signals and the actual time rate of change of the independently variable quantity.

The invention is especially adapted for use with programmed control of machine tools, such as computerized numerical control systems. In a typical machine tool it is desired to displace a first machine element with respect to a controlled axis in synchronism with the displacement of a second machine element with respect to a reference axis. This is accomplished by utilizing an input command signal which corresponds to the first order difference of the controlled axis displacement and which is processed to develop a position command signal. The reference axis displacement is produced by independently controlled drive means connected with the second machine element while the controlled axis displacement is produced by a servo motor connected with the first machine element and a feedback means connected therewith produces a feedback signal corresponding to the actual displacement. The position command signal and the feedback signal are combined in a summing means at each successive incremental reference axis displacement to produce a position error signal which is used to control the servo motor. Further, in accordance with the invention, a velocity signal is applied to the input of the servo and is derived as a product of the input command signal and a velocity signal from the reference axis machine element. Also, an acceleration signal may be applied to the servo and is derived by squaring the reference axis velocity signal and multiplying it by a second input command signal which corresponds to the second order difference of the controlled axis displacement. The invention may also be used in a servo system for velocity control which may be accomplished in the manner described above without the development of the position error signal.

The invention is especially adapted for servo systems as in automatic machine tool control in which an analog servo is utilized in conjunction with digital input command signals. This is accomplished by utilizing the reference axis generator to produce an update pulse for a given increment of displacement to gate the command signals from an input signal source such as a computer. In the case of the position error signal, the command signal is gated to a summing means and combined therein with the feedback signal. The digital position error signal is held in a register and converted to analog form prior to application to the servo. The velocity signal is developed by gating of the first input command signal to a register and then after conversion to analog form it is multiplied by a velocity signal from the reference axis to obtain a signal corresponding to the desired velocity with reference to the controlled axis. In a similar manner the acceleration signal is developed by gating the second command signal to a register and after conversion to analog form it is multiplied by the square of the velocity signal from the reference axis prior to application to the input of the servo.

A more complete understanding of the invention may be obtained from the detailed description which follows, taken with the accompanying drawings in which.

Referring now to the drawings; there is shown an illustrative embodiment of the invention in an automatic control system for a machine tool. In particular the illustrative embodiment is a computer numerical control system for a contouring machine tool. The contouring machine tool may be of any conventional type, such as a milling machine or lathe and may be of the multiple axis type. For explanatory purposes it is convenient to consider the application of the invention to an engine lathe in which the spindle or rotational axis is regarded as a reference axis R and a first controlled axis X extends in the direction of the lathe bed. In such a two axis system control of the cutting tool with respect to the two axes enables execution of a machining job such as the cutting of straight threads. A third axis of the machine extends in the direction of the cross slide for cross feed of the cutting tool. Control of the cutting tool along this axis, which may be regarded as the Y axis or second controlled axis, would permit the cutting of tapered threads for example. For the sake of simplicity, the invention will be described with reference to a two axis system, it being understood that a separate servo system and set of input command signals are required for each controlled axis.

Figure 1:
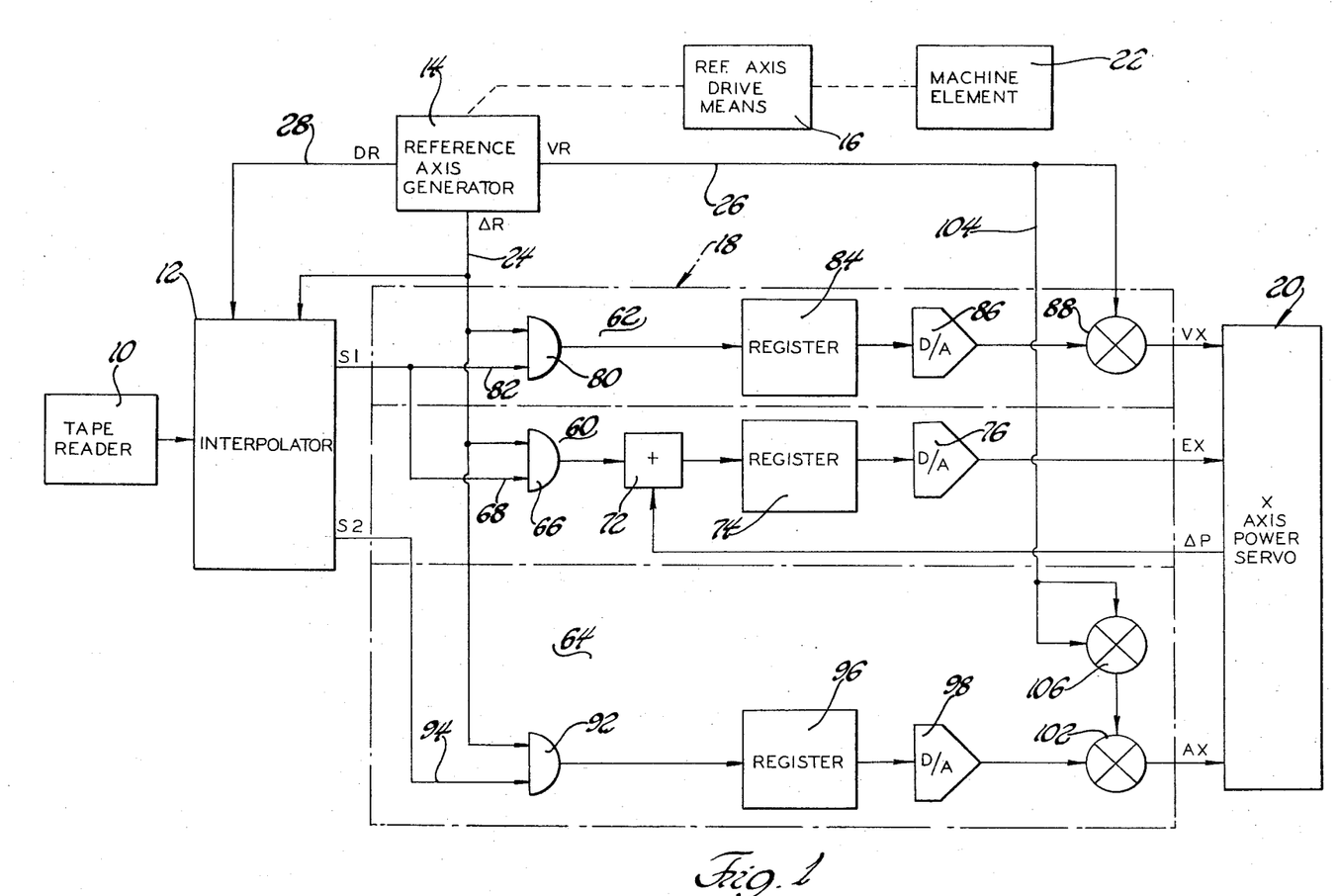
FIG. 1 is a block diagram of one embodiment of the invention.

The initial input to the control system for cutting a given workpiece is suitably in the form of a part program recorded on punched tape and read into the control system by a tape reader 10 in a conventional manner. The output of the tape reader is supplied to an interpolator which suitably takes the form of a general purpose digital computer or alternatively it may comprise a special logical device. One form of digital computer which is suitable for use with the present invention is known as the "PDP–8" manufactured and sold by the Digital Equipment Corporation of Maynard, Massachusetts. The interpolator 12 operates on the input data from the tape reader in response to successive update signals to produce successive values of a first input command signal S1 which is in digital form and which corresponds the first order difference of the controlled axis displacement. Suitably this signal S1 is a parallel binary word with a typical maximum length of three to 10 bits. The interpolator 12 also operates in response to the update pulses to produce successive values of a second input command signal S2 which is a digital signal corresponding to the second order difference of the controlled axis displacement. This signal S2 is in the form of a parallel binary word which is typically, but not necessarily, of less resolution than the signal S1 and may have a word length of two to five bits. The character of the command signals S1 and S2 will be described in greater detail subsequently in the explanation of operation of the system.

The interpolator 12 may be regarded as the input means for supplying the command signals S1 and S2 to the automatic control system of the present invention. The system further comprises a reference axis signal generator 14 with independently controlled drive means 16 and signal processing means 18 which develops input signals for a controlled axis power servo 20.

The machine tool being controlled, such as a lathe, includes a spindle or machine element 22 which is driven by the reference axis drive means 16 which suitably takes the form of an electric motor. The reference axis signal generator 14 is also driven by mechanical coupling with the drive means 16 and is adapted to produce certain input signals for the control system. The signal generator 14 includes a pulse generator which may be of conventional design such as a commutating switch which produces on conductor 24 an update pulse $\Delta R$ for a given increment of displacement of the machine element 22 with respect to the reference axis. The signal generator 14 also produces on conductor 26 a velocity signal $VR$ in analog form which is a voltage corresponding in magnitude and polarity to the time rate of change of displacement of the machine element 22 with respect to the reference axis. The velocity signal $VR$ is suitably produced by a conventional tachometer. The signal generator 14 also produces a direction signal DR on conductor 28 which has a positive polarity corresponding to one direction of motion and a negative polarity corresponding to the opposite direction of motion of the machine element 22. This direction signal is suitably derived from the tachometer generator used for producing the velocity signal on conductor 26. The update pulse signal on conductor 24 is supplied to the interpolator 12 to cause the interpolator to provide the next succeeding values of command signals S1 and S2 to the signal processing unit 18. The update signal is also provided to the signal processing unit 18 for purposes to be described presently. The direction signal from the signal generator 14 on conductor 28 is also supplied to the interpolator 12 to enable it to provide command signals indicative of the appropriate direction. The velocity signal from the signal generator 14 on conductor 26 is also supplied to the signal processing unit 18 for purposes to be described subsequently.

The signal processing unit 18 is adapted to develop control signals for the controlled axis power servo 20 so that it operates to displace the controlled axis machine element in precise correlation with the displacement of the reference axis machine element 22. The signal processing unit 18 may be especially adapted for either a position servo, i.e. where precise positioning is required or for a velocity servo, i.e. where precise control of velocity is desired but without precision control of position or displacement. In the exemplary embodiment for use with a machine tool a high degree of precision is provided for both position and velocity. For this purpose the signal processing unit 18 is adapted to provide a position error signal $EX$, a velocity signal $VX$ and an acceleration signal $AX$. The position error signal is effective to correct for the very small accumulative velocity or acceleration errors that may occur in the system. For use in a velocity servo the position error signal is not required and that portion of the signal processing unit pertaining thereto is deleted.

Figure 2:
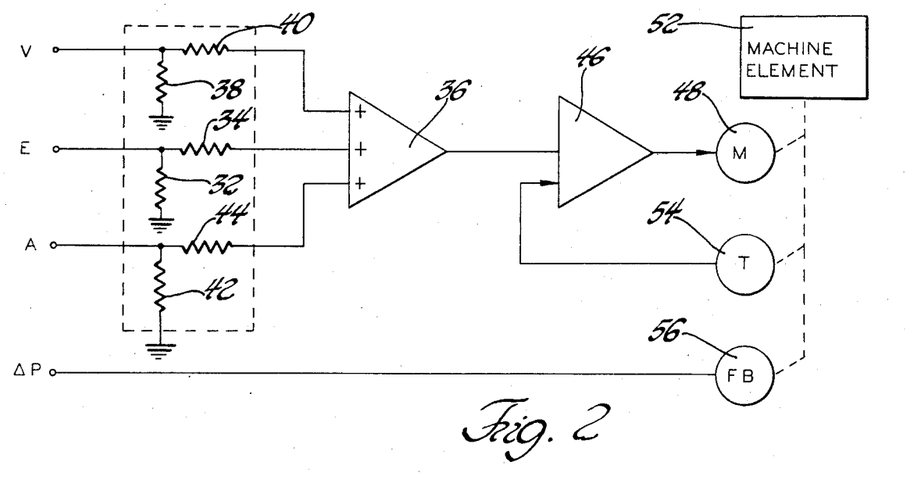
FIG. 2 is a diagram of the servo system which may be used in the invention; and, FIG. 3 is a block diagram of a modification of the invention.

Before describing the signal processing unit 18 reference is made to the controlled axis power servo 20 which is depicted in FIG. 2. It is to be noted that the control signals $EX$, $VX$, and $AX$, are of analog form and thus have a magnitude corresponding to position error, velocity and acceleration respectively and have a polarity corresponding to the directional sense of these quantities. The position error signal is applied through a scaling network including parallel resistor 32 and series resistor 34 to one input of a summing amplifier 36. Similarly, the velocity signal is applied through a scaling network including parallel resistor 38 and series resistor 40 to another input of the summing amplifier. In the same fashion the acceleration signal is applied through a scaling network including parallel resistor 42 and series resistor 44 to another input of the summing amplifier 36. The scaling networks are utilized to remove scaling factors to compensate for increment sizes and circuit characteristics of the servo control system. These networks also permit weighting of the control signals to match dynamic characteristics of the machine tool and the power servo system. The output of the summing amplifier 36 is applied to the input of a power amplifier 46 which controls the energization of a servo motor 48. The servo motor is mechanically coupled to the machine element 52, the motion of which is to be controlled with respect to the X axis or controlled axis. For stabilization of the servo loop a tachometer generator 54 may be mechanically coupled to the output shaft of the motor 48 and develops a feedback signal which is applied to the input of the power amplifier 46 in a conventional manner.

In order to develop a position signal corresponding to the actual position of the machine element 52, a feedback transducer 56 is also mechanically coupled to the shaft of the servo motor 448. The feedback transducer 56 is of conventional type, such as a commutator pulse type transducer or a digitized synchro. Such a transducer produces an output pulse for each incremental displacement of the machine element 52 with respect to the controlled axis. The transducer output pulse is of a polarity indicative of the direction of motion with reference to the controlled axis.

In order to develop the desired control signals for the controlled axis servo, the signal processing unit 18 is provided with a position error signal channel 60, a velocity signal channel 62 and an acceleration signal channel 64. The position error channel 60 comprises gate circuits 66 which have their input conductors 68 connected with the command signal $S1$ from the interpolator 12. The gate inputs of the circuits 66 are connected with the output conductor 24 of the reference axis signal generator 14 and thus receive the update pulse $\Delta R$. The outputs of the gate circuits 66 are applied to one input of an adding circuit 72, preferably in the form of a table adder, having a pair of inputs adapted for parallel binary signals. An update pulse is produced by the reference axis signal generator upon a given increment of displacement of the machine element 22 and causes the gate circuit 66 to transmit the command signal $S1$ in parallel binary form to one input of the adder 72. The other input of the adder 72 is connected with the output of the feedback transducer 56 and thus the actual incremental displacement pulses $\Delta P$ are applied thereto with the proper sign so that the output of the adder 72 indicates the instantaneous difference between the whole number of pulses represented by the command signal $S1$ and the whole number of feedback pulses. The output of the adder 72 is held by a register 74 and represents in digital form the value of the position error. The output of the register 74 is applied to the input of a digital to analog converter 76 to produce the position error signal $EX$ in analog form which is applied to the input of the power servo.

It is to be noted in reference to the position error signal channel 60 that the next discrete command signal $S1$ is applied to the adder 72 each time an update pulse $\Delta R$ is produced by the signal generator 14 signifying that the machine element 22 has been displaced through an additional increment of a given fixed value. The update pulse not only signals the interpolator to output the next command signal but it also opens the gate circuit 66 to apply the signal to the adder 72. It is to be noted that the whole number represented by the command signal corresponds to a certain displacement of the machine element 52 with respect to the controlled axis and this certain value of displacement is achieved by a certain number of small increments of displacement, each of which is represented by a single feedback pulse $\Delta P$. A single pulse $\Delta P$ may be equal to the least significant bit of the command signal $S1$ or a multiple thereof. The command signal $S1$ is not synchronous with the feedback signal, i.e. a number of feedback pulses $\Delta P$ will be applied to the adder 72 between updates of the command signal $S1$ In order to control the velocity of the power servo 20 in a manner consistent with the command signal $S1$, the signal channel 62 produces the control signal $VX$ which corresponds to the required rate of change with respect to time. This channel comprises gate circuits 80 having their inputs connected through conductors 82 with the command signal S1 output of the interpolator 12. The gate input of the circuit 80 is connected to the signal generator 14 through the conductor 24 and thus receives the update pulse $\Delta R$ upon each increment of displacement of the machine element 22. The command signal S1 is thus applied from the output of the gate circuit 80 to the input of a register 84 which holds the command signal during the interval between update pulses. The command signal S1 is converted from digital to analog form by a converter 86 and the output thereof is applied to one input of a multiplier 88. Another input of the multiplier is connected through the conductor 26 to the velocity output of the signal generator 14. The multiplier 88 has its output connected to the controlled axis power servo, as indicated in FIGS. 1 and 2 and the output signal VX developed thereby corresponds to the product of the command signal S1 and the velocity signal VR, as will be explained in detail subsequently.

In order to provide additional control of the response of the controlled axis servo in accordance with the command signals, the acceleration signal AX is developed by the signal channel 64. This channel comprises gate circuits 92 having their inputs connected by conductors 94 to the second input command signal S2 of the interpolator 12. The gate inputs of the circuit 92 are connected to the conductor 24 and thus receive the update pulse $\Delta R$ upon each fixed increment of displacement of the machine element 22. The output of the gate circuit 92 is applied to the input of a register 96 which holds the command signal S2 during the interval between update pulses. The command signal S2 is applied by the register 96 to the input of a digital to analog converter 98 and the analog output thereof is applied to one input of a multiplier 102. In order to develop the acceleration signal AX the velocity signal VR from the signal generator 14 is applied through the conductor 26 and a conductor 104 to a squaring circuit which suitably takes the form of a multiplier 106, having the signal VR applied to both inputs thereof. An intermediate signal corresponding to the square of the velocity signal VR is developed at the output of the multiplier 106 and applied as an input to the multiplier 102. The output of the multiplier 102 is applied to the input of the controlled axis power servo as the acceleration signal AX which corresponds to the product of the command signal S2 and the square of the velocity signal VR as will be explained subsequently.

The operation of the inventive control system will now be described with reference to FIG. 1 and FIG. 2. As described above the interpolator 12 accepts input data from the tape reader 10 and in response to the update signal $\Delta R$ it produces the command signals S1 and S2. It will be recalled that the control system in the exemplary embodiment is adapted to control the motion of the machine element 52 with reference to a controlled axis in precise correlation with the motion of the machine element 22 with respect to the reference axis. The motion with respect to the reference axis may be regarded as the independent variable and thus the reference axis drive means 16 may be independently controlled and, for example, may be operated at a predetermined speed. Consequently, the reference axis generator 14 will produce an update pulse $\Delta R$ for each given increment of displacement with respect to the reference axis and of course the occurrence of the update pulses in time will depend upon the speed of the reference axis drive means 16. Upon the occurrence of each update pulse the interpolator produces a value of command pulse S1 and a value of command pulse S2 in accordance with the configuration of the path to be cut by the machine tool, i.e. the functional relationship between the reference axis and controlled axis coordinates of the points on the path. This relationship in generalized form may be expressed as:

$$x = f(r) \quad (1)$$

where the value of $x$ is defined only for integral values of $r$.

For reasons that will appear subsequently the input command signals S1 and S2 are of values corresponding to the first and second order differences, respectively, of the function of $r$, i.e. the independently variable quantity $x$. The first order difference of the quantity $x$ may be expressed as a function of $r$ as follows:

$$\Delta x = \Delta f(r) = f(r+1) - f(r) \quad (2)$$

where:
$\Delta$ is the difference operator
$x$ is the coordinate on the X-axis
$r$ is the coordinate on the R-axis and $r$ has integral values only.

The input command signal S1 has a value corresponding to the first order difference of the quantity $x$ and therefore may be expressed as:

$$S1 = \Delta x \quad (3)$$

The second order difference of the variable $x$ as a function of $r$ may be expressed as:

$$\Delta^2 x = \Delta^2 f(r) = f(r+2) - 2f(r+1) + f(r) \quad (4)$$

The second command signal S2 has a value corresponding to the second order difference of the quantity $x$ and may be expressed as follows:

$$S2 + \Delta^2 x \quad (5)$$

Upon the occurrence of each update pulse $\Delta R$ the next value of the command signal S1 which corresponds to the first order difference of the quantity $x$ is applied through the gate 66 to the adder 72. The command signal S1 is transmitted in the form of a binary number and the feedback signal in the form of pulses $\Delta P$ is subtracted therefrom in the adder 72 and the difference constitutes the position error signal in digital form and is stored in the register 74. The position error signal is converted by the digital to analog convert 76 to analog form and this signal EX is applied to the input of the servo 20 as indicated in FIGS. 1 and 2. It is to be noted that the signal S1 corresponding to the first order difference $\Delta X$ as applied to the adder 72 represents the number of incremental units or increments of displacement desired for the machine element 52 for each increment of displacement of the machine element 22. The increment of displacement of the machine element 22 is a fixed quantity and the signal $\Delta R$ is produced for each increment. Similarly, the displacement of the machine element 52 is measured in incremental units or increments and the number is represented by the command signal S1. Such units are of the same size as the increments measured by the feedback generator 56 which produces a pulse $\Delta P$ corresponding to each increment.

As noted above, the velocity signal $VX$ for control of the servo 20 is developed as the product of the command signal $S1$ and the velocity signal $VR$ from the reference axis generator 14. The velocity signal $VR$ which has a magnitude and polarity corresponding to the actual time rate of change of the machine element 22 supplies a time base which is inserted in the control signals and may be expressed as:

$$VR = dr/dt \quad (6)$$

Considering that the motion of the machine element 22 with respect to the reference axis may be divided into a multiplicity of fixed increments, the value of the velocity, i.e. $dr/dt$ may be treated as a constant during each increment. For successive increments the quantity $dr/dt$ may be regarded as having a numerator of constant value which corresponds to the increment represented by $\Delta R$. Therefore for practical purposes the denominator may be as having a small incremental value $\Delta t$ and the following relationship is obtained:

$$VR = dr/dt = 1/\Delta t \, (K) \quad (7)$$

where $K$ is a constant corresponding to the value of the increment of displacement $\Delta R$ with respect to the reference axis. Accordingly, the velocity signal $VX$ may be written as:

$$VX = (\Delta X)(VR)$$

or $$VX = (\Delta X)(1/\Delta t)(K1) \quad (8)$$

where $K1$ is a scale factor.

Thus the velocity signal $VX$ is produced in the multiplier 88 in analog form and is applied to the servo 20. Note that equation (8) expresses $VX$ in the form of a first time derivative which corresponds to velocity.

As previously described, the acceleration signal $AX$ is developed as the product of the command signal $S2$ and the square of the velocity signal $VR$. The command signal $S2$ which represents the second order difference of the variable quantity $x$ is applied through the gate 92 to the register 96 upon the occurrence of each update pulse $\Delta R$. The acceleration signal $AX$ may be expressed as follows:

$$AX = (\Delta^2 x)(VR)^2$$

Referring to equation (7) above, this may be rewritten as:

$$AX = (\Delta^2 x)(1/\Delta t)^2 (K2)$$

or $$AX = \Delta^2 x/\Delta t^2 (K2) \quad (9)$$

where $K2$ is a scale factor.

Equation (9) for the acceleration signal $AX$ is of the form of the second derivative of $x$ with respect to time, otherwise known as acceleration and in practice the signal $AX$ does approximate the acceleration required of the machine element 52.

Thus the servo 20 is provided with the position error signal $EX$, the velocity signal $VX$ and the acceleration signal $AX$ and they function to maintain precise positional correlation between the machine element 52 and the machine element 22 throughout the execution of the command signals. As alluded to in the description above, the control system may be operated as a velocity servo by omitting the position control channel 60 and precise velocity relationship will be maintained between the machine element 22 and the machine element 52.

Figure 3:
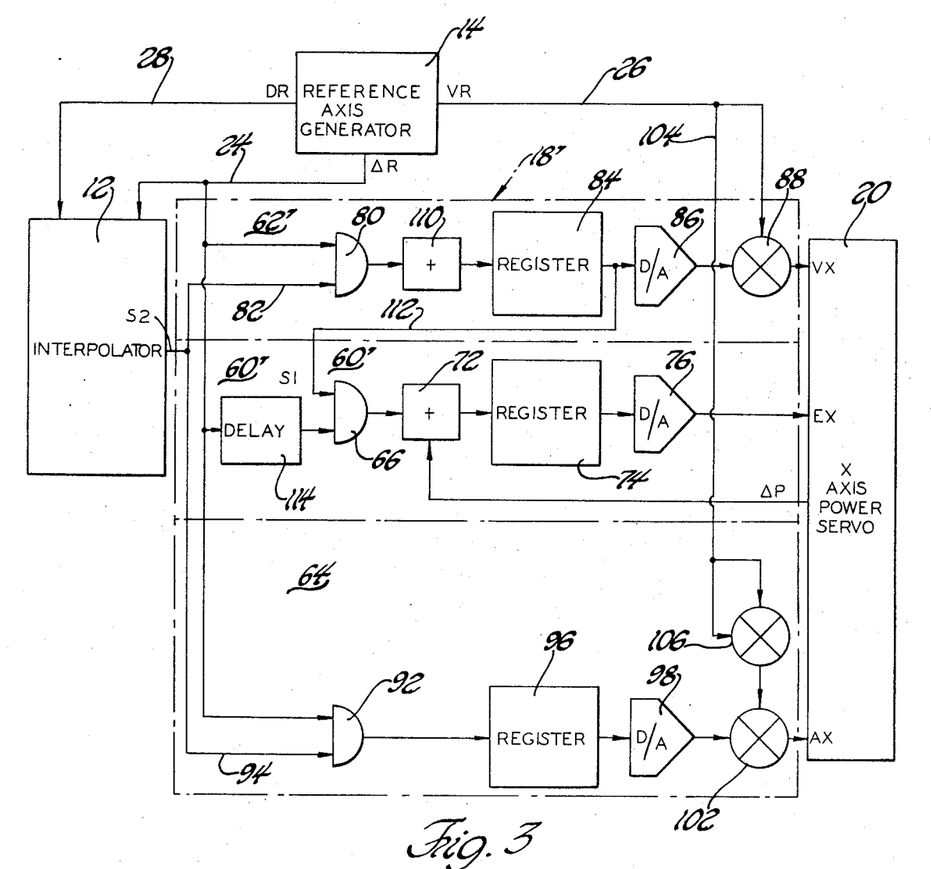

A modification of the inventive control system is shown in FIG. 3 wherein the interpolator 12 is required to furnish only the command signal $S2$. In this system a modified signal processing unit 18' is provided while the reference axis generator 14 and the controlled axis power servo 20 remain the same as previously described. The modified signal processing unit 18' may provide precise position control and velocity control of the machine element 52 with respect to machine element 22 or it may be utilized for velocity control only, as will be apparent from the description that follows.

The signal processing unit 18' comprises a position control channel 60' for developing the position error signal $EX$, a velocity control channel 62' for developing the velocity signal $VX$ and an acceleration control channel 64 for developing the acceleration signal $AX$. In this embodiment the velocity control channel 62' is utilized in developing input for the position control channel 62' and will therefore be described first. The input command signal $S2$ from the interpolator which corresponds to the second order difference of the variable quantity $x$ is applied to the input of the gate circuit 80 through the conductor 82. The update signal $\Delta R$ is applied through conductor 24 to the gate input of the gate circuit 80 for each increment of displacement with respect to the reference axis. Accordingly, the command signal $S2$ is applied through the gate circuit 80 to an adder 110, the output of which is applied to the register 84. The register 84 thus maintains a summation or integral of all of the preceding values of the command signal $S2$. Thus at any given time the register 84 holds a number value which, as the summation of the second order difference signals represented by $S2$, is equal to the first order difference, i.e. the signal $S1$. This number can be either of positive or negative polarity according to direction of travel. The signal $S1$ is applied to the digital to analog converter 86 and thence to the one input of the multiplier 88. The velocity signal $VR$ from the reference axis generator 14 is applied through a conductor 26 to the other input of the multiplier 88. Accordingly, the velocity signal $VX$ is developed at the output of the multiplier 88 in the manner described with reference to FIG. 1 and applied to the input of the servo 20.

Referring now to the position control channel 60', the command signal $S1$ is derived from the register 84 and applied through a conductor 112 to the input of the gate circuit 66. The update signal $\Delta R$ is applied through a conductor 24 to a delay circuit 114 which delays the update pulse long enough for the updating of register 84 and then is applied to the gate input of the gate circuit 66. Accordingly, the new value of the command signal $S1$ from the register 84 is applied through the gate circuit 66 to the adder 72. The adder 72 combines the command signal $S1$ and the feedback signal $\Delta P$ and the algebraic sum thereof is held in register 74 as the position error signal. The digital output from the register 74 is applied to the converter 76 and the analog output thereof is applied to the input of servo 20 as the position error signal $EX$.

The acceleration control channel 64 is identical to that described with reference to FIG. 1 and produces the acceleration control signal $AX$ which is applied to the input of the servo 20.

Although the description of this invention has been given with reference to a particular embodiment thereof, it is not to be construed in a limiting sense. Many variations and modifications will now occur to those skilled in the art. For a definition of the invention, reference is made to the appended claims.

The embodiments of the present invention in which an exclusive property or privilege is claimed are defined as follows:

I claim:

1. The method of controlling the value of a dependently variable quantity as a function of an independently variable quantity comprising: changing the independently variable quantity as a predetermined function of time, repeating in succession the steps of producing discrete command signals comprising a number representing a desired change of the dependently variable quantity corresponding to a fixed increment of change of the independently variable quantity, changing the dependently variable quantity, producing a feedback signal comprising a number representative of the actual change of the dependently variable quantity, producing an error signal corresponding to the difference between the feedback signal and the sum of previous command signals, continuing to change the dependently variable quantity until the error signal is zero, and producing the next command signal when the independently variable quantity is changed by said fixed increment.

2. The invention as defined in claim 1 wherein the steps include producing a discrete time base signal concurrently with each command signal and which corresponds to the rate of change of the independently variable quantity with respect to time, multiplying the time base signal and the corresponding command signal to obtain a velocity signal, and changing the dependently variable quantity at a rate corresponding to said velocity signal.

3. The invention as defined in claim 2 wherein the discrete command signal corresponds to the first order difference of the dependently variable quantity and further including the steps of: producing a second discrete command signal concurrently with the first mentioned command signal and which comprises a number representing the second order difference of the dependently variable quantity, producing an intermediate signal corresponding to the square of the time base signal, producing an acceleration signal corresponding to the product of the second command signal and the intermediate signal and modifying the rate of change of the dependently variable quantity in accordance with said acceleration signal.

4. A system for producing displacement of a first element with respect to a controlled axis in synchronism with displacement of a second element with respect to a reference axis comprising input means for supplying a first signal corresponding to the desired change of controlled axis displacement during a fixed increment of change of reference axis displacement, drive means connected with the second element for displacement thereof at a predetermined rate with respect to the reference axis, a servo motor connected with the first element for displacement thereof with respect to the controlled axis, feedback means connected with the first element for producing a feedback signal corresponding to the actual displacement of the first element, summing means connected with the input means and the feedback means for adding the first signal and the feedback signal to produce a position error signal, and amplifying means connected between the output of the summing means and the servo motor to control the displacement of the first element.

5. The invention as defined in claim 4 including signal generator means connected with said drive means and producing a time base signal representative of the time rate of change of said second element with respect to the reference axis, multiplying means having a first input connected with said input means and a second input connected with said signal generator means, said multiplying means producing a velocity signal corresponding to the product of the first and the time base signals and being connected with an input of said amplifying means to influence a control of the displacement of said first element.

6. The invention as defined by claim 5 wherein said input means includes a first output for supplying said first signal and a second output for supplying a second signal, said second signal corresponding to the second order difference of the controlled axis displacement, squaring means connected with said signal generator and adapted to produce an intermediate signal corresponding to the square of the time base signal, additional multiplying means having one input connected with said second input means and the other input connected with said squaring means to produce an acceleration signal cocorresponding to the product of the second signal and said intermediate signal, the output of said additional multiplying means being connected with the input of said amplifying means to influence the control of the displacement of said first element.

7. A system for producing displacement of a first element with respect to a controlled axis in synchronism with displacement of a second element with respect to a reference axis comprising: input means for supplying a first signal corresponding to the first order difference of the controlled axis displacement, first summing means for integrating the first signal during successive intervals of reference axis displacement to produce a second signal corresponding to the second order difference of the controlled axis displacement, drive means connected with the second element for displacement thereof with respect to the reference axis, a servo motor connected with the first element for displacement thereof with respect to the controlled axis, feedback means connected with the first element for producing a feedback signal corresponding to the actual displacement of the first element, second summing means connected with the first summing means and the feedback means for adding the second signal and the feedback signal during successive intervals of reference axis displacement to produce a position error signal, signal generator means connected with said drive means and adapted to produce a third signal corresponding to the time rate of change of said second element with respect to the reference axis, multiplying means having one input connected with the signal generating means and the other input connected with the output of the first summing means to produce a velocity signal corresponding to the product of the second and third signals, and amplifying means having a first input connected with the output of the second summing means and a second input connected with the output of the multiplying means to control the displacement of the first element in accordance with the position error and velocity signal.

8. A system for producing displacement of a first element with respect to a controlled axis in synchronism with displacement of a second element with respect to a reference axis comprising: first input means for supplying a first signal corresponding to the first order difference of the controlled axis displacement, drive means connected with the second element for displacement thereof with respect to the reference axis, a servo motor connected with first element for displacement thereof with respect to the controlled axis, a signal generator connected with the second element for producing a time base signal representing the actual rate of change of reference axis displacement with respect to time, first multiplying means connected with the first input means and the signal generator for developing a velocity control signal corresponding to the desired time rate of change of the controlled axis displacement, and amplifying means connected between the output of the multiplying means and the input of said servo motor to control the displacement of the first element.

9. The invention as defined in claim 8 including second input means for supplying a second signal corresponding to the second order difference of the controlled axis displacement, squaring means connected with the signal generator and adapted to produce an intermediate signal corresponding to the square of said time base signal, additional multiplying means having a first input connected with the output of said squaring means and a second input connected with said second input means and adapted to produce an acceleration signal corresponding to the product of the intermediate signal and the second signal, the output of said additional multiplying means being connected with the input of said amplifying means to influence the control of the displacement of said first element.

10. a system for producing displacement of a first element with respect to a controlled axis in synchronism with displacement of a second element with respect to a reference axis comprising: input means for supplying a first signal corresponding to the second order difference of the controlled axis displacement, first summing means connected with said input means to integrate said first signal over successive intervals of displacement with respect to said reference axis and producing a second signal corresponding to the first order difference of the controlled axis displacement, signal generator means connected with said drive means and adapted to produce a time base signal corresponding to the actual rate of change of reference axis displacement with respect to time, multiplying means having one input connected with said signal generator means and the other input connected with said first summing means and adapted to produce a velocity signal corresponding to the product of said second and time base signals, squaring means connected with said signal generating means and adapted to produce an intermediate signal corresponding to the square of said time base signal, additional multiplying means having a first input connected with said input means and a second input connected with said squaring means and adapted to produce an acceleration signal corresponding to the product of said intermediate and said first signals, and amplifying means having one input connected with the output of the first multiplying means and another input connected with the output of the additional multiplying means, the output of said amplifier being connected with said servo motor to control the displacement of said first element in accordance with the said velocity and acceleration signals.

11. A system for producing displacement of the first element with respect to a controlled axis in synchronism with displacement of a second element with respect to a reference axis comprising: first digital signal input means for supplying a first digital signal corresponding to a desired first order difference of the controlled axis displacement, drive means connected with the second element for displacement thereof with respect to the reference axis, a servo motor connected with first element for displacement thereof with respect to the controlled axis, signal generating means connected with the second element, said signal generating means having a fist output for producing an update pulse signal upon each increment of displacement of the second element, first summing means, gating means having inputs connected to said first signal input means and said first output of said signal generating means and having an output connected to said summing means, said gating means being responsive to an update pulse signal for applying said first digital signal to one input of the summing means, a position feedback signal generator connected with the first element for producing a digital feedback signal corresponding to the actual displacement of the first element, said feedback signal being applied to another input of said summing means, and a first digital to analog converter connected to the output of said summing means for producing an analog position error signal corresponding to the difference between the desired and actual position of the first element, and amplifying means having its input connected to the converter means and having its output connected to the servo motor to control the displacement of the first element.

12. The invention as defined in claim 11 wherein said signal generating means has a second output for producing an analog time base signal corresponding to the actual rate of change of reference axis displacement with respect to time, a first register, second gating means having inputs connected with the first output means of the signal generating means and the first signal input means and having an output connected to said first register, a second digital to analog converter having an input connected with said first register, and analog multiplying means having one input connected with the output of the converter and another input connected with the second output of the signal generating means and producing a velocity signal corresponding to the product of the time base signal and said first signal, the output of said multiplying means being connected with said amplifying means to influence the control of the displacement of said first element.

13. The invention as defined in claim 12 including second digital signal input means for supplying a second digital signal corresponding to the second order difference of the controlled axis displacement, a second register, third gating means having inputs connected with the first output means of the signal generating means and the second digital signal input means and having an output connected with said second register, a third digital to analog converter connected with the output of said second register, squaring means connected with the second output means of the signal generating means and adapted to produce an intermediate signal corresponding to the square of said time base signal, second multiplying means having an input connected with the output of said squaring means and another input connected with the output of said third converter to produce an acceleration signal corresponding to the product of said intermediate signal and said second digital signal over a given interval of reference axis displacement, the output of said second multiplying means being connected with the input of said amplifying means to influence the control of displacement of the first element.

14. A system for producing displacement of a first element with respect to a controlled axis in synchronism with displacement of a second element with respect to a reference axis comprising: first digital signal supply means for supplying a first digital signal corresponding to the second order difference of the controlled axis displacement, drive means connected with the second element for displacement thereof with respect to the reference axis, a servo motor connected with the first element for displacement thereof with respect to the controlled axis, signal generating means connected with the second element and having a first output for producing an update pulse signal upon each increment of displacement of the second element and having a second output for producing an analog signal corresponding to the actual rate of change of reference axis displacement with respect to time, first summing means, first gating means having inputs connected with the first output of the signal generating means and with the digital signal supply means and an output connected with said first summing means whereby said first signal is applied to said first summing means in response to an update pulse, said first summing means being operative to integrate said first signal to develop a second signal corresponding to the second order difference of the controlled axis displacement, a first register connected with the output of the first summing means for holding said second signal, digital to analog converter means having an input connected with said register, multiplying means having one input connected with the converter means and the other input connected with the second output of the signal generating means and producing an output corresponding to the product of said second and time base signals, and amplifying means connected between the first multiplying means and the servo motor to control the displacement of the first element.

15. The invention as defined in claim 12 including a second register, second gating means having one input connected with the first digital signal supply means and another input connected with the first output of the signal generating means and having an output connected with said second register to hold said first signal during each update interval, second digital to analog converter means having an input connected with said second register, squaring means connected with the second output of the signal generating means and adapted to produce an intermediate signal corresponding to the square of said time base signal, and a second multiplying means having an input connected with said squaring means and another input connected with said second converter and adapted to produce an acceleration signal corresponding to the product of the first signal and said intermediate signal, the output of said second multiplying means being connected with said amplifying means to influence the control of the displacement of said first element.

16. The invention as defined in claim 13 including second summing means, third gating means having one input connected with said first register, delay means, the first output of the signal generating means being connected through said delay means to the other input of the third gating means, the output of the third gating means being connected to one input of said second summing means, a position feedback signal generator connected with the first element for producing a digital feedback signal corresponding to the actual displacement of the first element, said feedback signal being applied to another input of said second summing means, a third register connected with the output of said second summing means to hold a position error signal corresponding to the difference between said second signal and said position feedback signal, a third digital analog converter means connected with the output of the third register to develop an analog position error signal, the output of said third converter means being connected with the input of said amplifying means to influence the control of the displacement of said first element.

17. A system for synchronizing motion of a first element with a second element comprising: drive means for displacing the second element at a desired rate, signal means for producing a time base signal corresponding to the rate of change of displacement of the second element with respect to time, input means supplying a command signal for each interval of displacement of the second element, said command signal corresponding to the first order difference of displacement of the first element, and servo means connected with the input means and signal means for controlling the motion of the first element in accordance with the product of the command signal and the time base signal.

18. A system for synchronizing motion of a first element with a second element comprising: drive means for displacing the second element at a desired rate, input means supplying a command signal indicative of the desired change of displacement of the first element for a given interval of displacement of the second element, servo means connected with said first element for controlling the displacement thereof, feedback means producing a signal indicative of the actual displacement of the first element, summing means connected with the input means and the feedback means for producing a position error signal corresponding to the difference between the command signal and the feedback signal and amplifying means connected between said summing means and said servo motor for controlling the energization of said motor.

19. The invention as defined in claim 18 including signal means for producing a time base signal corresponding to the rate of change of displacement of the second element with respect to time, multiplying means for producing a velocity signal corresponding to the product of the command signal and said time base signal, said multiplying means being connected with the input of said amplifying means to influence the control of energization of said servo motor.

20. The method of controlling the value of a dependently variable quantity as a function of an independently variable quantity comprising the steps of producing a discrete command signal in time sequence each of which corresponds to the desired change of the controlled variable for successive equal increments of change of the independently variable quantity, initiating a change of said dependently variable quantity, producing a feedback signal constituted of a number of pulses each of which represents an incremental value of change of the dependently variable quantity, continuing the change of the dependently variable quantity so long as there is a difference between the number represented by the command signal and the number represented by the feedback signal, holding any remaining difference between said numbers, and producing the succeeding command pulse after the independently variable quantity has changed through said increment.

* * * * *

UNITED STATES PATENT OFFICE
CERTIFICATE OF CORRECTION

Patent No. 3,731,175　　　　　　　　Dated May 1, 1973

Inventor(s) Dudley B. Hartung

It is certified that error appears in the above-identified patent and that said Letters Patent are hereby corrected as shown below:

Assignee: "Xerox Corporation" should be Xenex Corporation

Col. 5, last line, "448" should be --48--

Col. 12, line 34, "cocorresponding" should be --corresponding--

Col. 13, line 45, first word "a" should be --A--

Col. 14, line 27, "fist" should be --first--

Signed and sealed this 27th day of November 1973.

(SEAL)
Attest:

EDWARD M. FLETCHER, JR.　　　　　RENE D. TEGTMEYER
Attesting Officer　　　　　　　　Acting Commissioner of Patents